Figure 1:
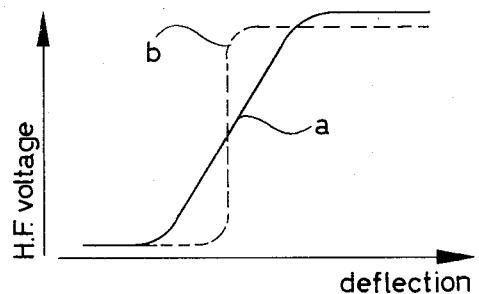

March 21, 1961     E. UNGER     2,976,495
INSTRUMENT MOVEMENT CONTROLLED HIGH FREQUENCY INDUCTOR
Filed April 8, 1957     2 Sheets-Sheet 1

*Inventor:*
Erich Unger

United States Patent Office 2,976,495
Patented Mar. 21, 1961

2,976,495

INSTRUMENT MOVEMENT CONTROLLED HIGH FREQUENCY INDUCTOR

Erich Unger, Nurnberg, Germany, assignor to Metrawatt Aktiengesellschaft, Nurnberg, Germany Filed Apr. 8, 1957, Ser. No. 657,996

1 Claim. (Cl. 331—181)

It is often desired to use the pointer or needle or other equivalent pivotable element of the customary measuring instrument to operate a contact, for example, for giving an alarm signal, as soon as a predetermined limit has been reached. The movement of the pointer should, however, not be affected by such operation.

For this purpose, various control systems have been developed which operate, for example, photoelectrically or thermally. Inductive control systems operating in a high frequency oscillation circuit have also been known for a long time. When in such device the particular limit value is exceeded, a metal vane carried by the measuring pointer passes between the two coils of an oscillator. The change of the induction from one coil to the other caused by the eddy-current within the vane reduces the oscillator voltage and operates a relay. This arrangement, when of the proper dimensions, does not exert any noticeable forces upon the vane and also operates very safely. The control characteristic (curve) of this arrangement is, however, rather flat since the slope (S) is very small.

$$S = \frac{\text{relative change of output current}}{\text{travel of control vane}}$$

as compared with other control systems. In most cases, however, a steep slope is desired. Even the use of specially shaped induction coils or pointed high-frequency iron cores does not increase the steepness considerably. Although the steepness of the control characteristic may be further increased by various special circuits, especially by the use of several tubes and accurately balanced oscillatory circuits, this complicates the arrangement so considerably that the real advantage of a simple and safe construction is lost.

Until this time, because of the required high control accuracy, the simple control systems responsive to meter pointer positions could only be of the well-known mechanical or photoelectric type which, however, have considerable disadvantages.

Thus, for example, the mechanical control systems obstruct directly or indirectly the movement of the meter pointer. The optical devices, on the other hand, require a large expenditure of optical means and are easily affected, for example, by stray light.

Although these disadvantages have been substantially avoided by the use of the known inductive control systems, the practical application thereof was prevented by the inadequate steepness of the control characteristic.

It is the object of this invention to provide an arrangement for improving the control characteristic of an inductive control system responsive to meter pointer positions which is operated by high frequency, whereby the control vane carried by the pointer of the measuring instrument changes the inductivity of two coils. Such improvement is attained according to the invention by securing supplementary metallic diaphragms in a fixed position on or in the vicinity of the front sides of the oscillator coils.

Such firm mounting of these additional diaphragms or screens now renders it possible to increase the steepness of the control characteristic many times so that a simple oscillator arrangement may be used as a control system responsive to meter pointer positions.

The invention will now be described with reference to the drawings.

Curve $a$ in Fig. 1 indicates the control characteristic of a coil arrangement without diaphragms, while curve $b$ in Fig. 1 shows the control characteristic of the same coil arrangement with diaphragms.

Figure 2:
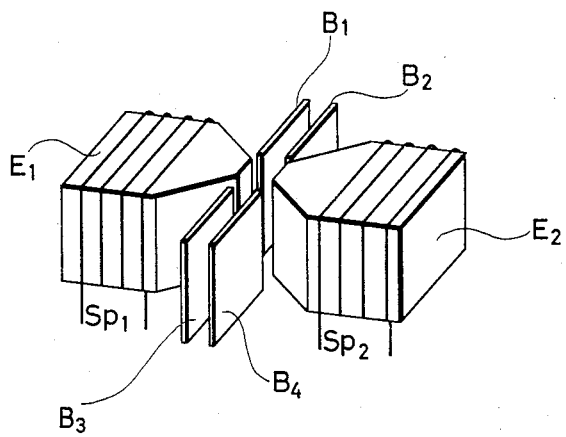

One embodiment of the coil arrangement with diaphragms is shown in Fig. 2. The iron cores $E_1$ and $E_2$ carry the oscillator coils $Sp_1$ and $Sp_2$. The addition of the four metallic diaphragms $B_1$ to $B_4$ increases the steepness of response from that in accordance with curve $a$ to that in accordance with curve $b$ of Fig. 1.

Figure 3:
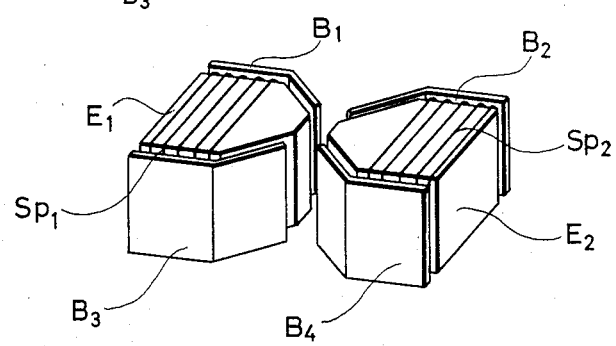

A modification of the invention which is of considerable advantage may be attained by making the metallic diaphragms in the form of conforming plates, the shape of which is adapted to the shape of the iron cores and coils, and by securing these diaphragms laterally of the high-frequency coils (see Fig. 3).

Figure 4:
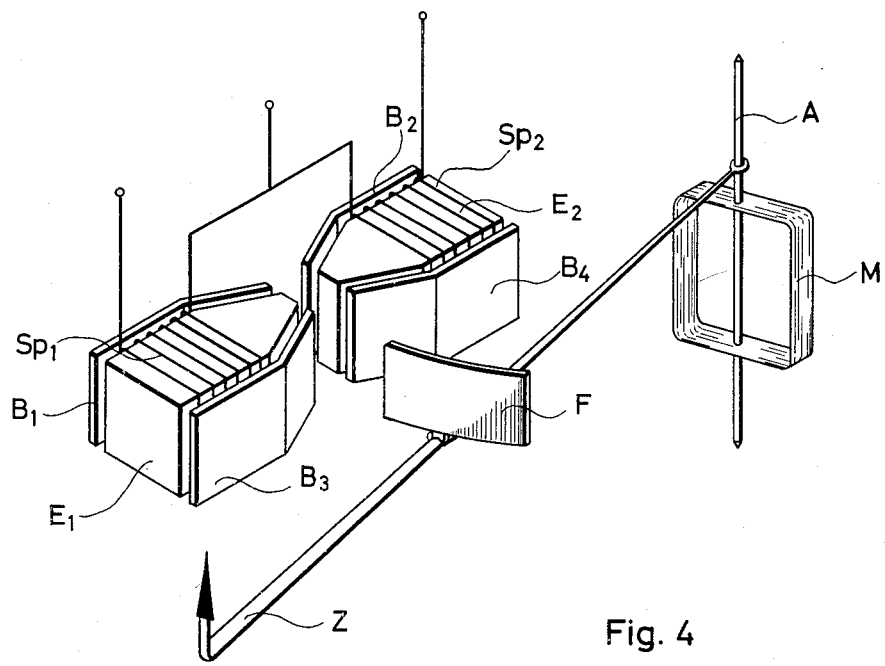

Fig. 4 illustrates the manner in which the coil arrangement according to the invention cooperates, for example, with the pointer of a moving-coil measuring instrument. The coil arrangement as shown corresponds to the embodiment according to Fig. 3. Pointer Z which is mounted on the shaft A of the moving coil M carries a metal vane F which is disposed so as to enter between the two iron cores $E_1$ and $E_2$ and their respective diaphragms $B_1$ and $B_3$ or $B_2$ and $B_4$.

We claim:

In a device for measuring a variable characteristic and for indicating when the variable characteristic being measured reaches a predetermined value as determined by the output voltage of a control oscillator, the output voltage being controlled by the variation of the mutual magnetic induction between spaced, serially connected and mutually inductive high frequency coils forming a part of the oscillator, the improvement which comprises a measuring meter movement having a pivotal pointer movable in response to a variable characteristic being measured, a metallic arcuate vane attached to and extending from either side of said pointer, a pair of spaced ferromagnetic cores having tapered adjacent ends forming rectangular and parallel core faces for concentrating the magnetic induction field between said serially connected mutually inductive coils positioned within the high frequency coils of the oscillator and on either side of the path of travel of the vane, the arcuate vane passing between the core faces when the pointer in response to the variable characteristic being measured exceeds the predetermined value, and metallic diaphragms shielding the tapered cores whereby the mutual induction between the high frequency coils is sharply reduced when the vane passes between the core faces.

References Cited in the file of this patent

UNITED STATES PATENTS

| | | |
|---|---|---|
| 2,285,798 | Bergtold | June 9, 1942 |
| 2,647,252 | Moore | July 28, 1953 |
| 2,907,931 | Moore | Oct. 6, 1959 |